June 19, 1934.   C. L. EKSERGIAN   1,963,229

DUAL DISK WHEEL

Filed July 22, 1930

INVENTOR.
CAROLUS L. EKSERGIAN
BY
ATTORNEY.

Patented June 19, 1934

1,963,229

UNITED STATES PATENT OFFICE 1,963,229

DUAL DISK WHEEL

Carolus L. Eksergian, Detroit, Mich., assignor to Budd Wheel Company, Philadelphia, Pa., a corporation of Pennsylvania Application July 22, 1930, Serial No. 469,786

1 Claim. (Cl. 301—36)

My invention relates to the art of vehicle wheels and pertains more particularly to the means for clamping a wheel on a hub. It was evolved in an attempt to provide effective means for clamping a dual disk wheel on a hub flange, but it will be obvious that it has other applications.

One object of my invention has been to provide an enlarged seat surface on a relatively thin disk adapted to cooperate with adjacent portions of a hub flange and securing nut. A further object has been to provide a wheel mounting in which the securing nuts are resiliently held in place, the wheel body constantly acting with a lock washer effect. A still further object has been to provide an inexpensive dual wheel mounting which is both strong and secure and in which the inner and outer wheels are interchangeable.

Further objects and advantages of my invention will be apparent from a reading of the subjoined specification in the light of the attached drawing, in which.

Figure 1:
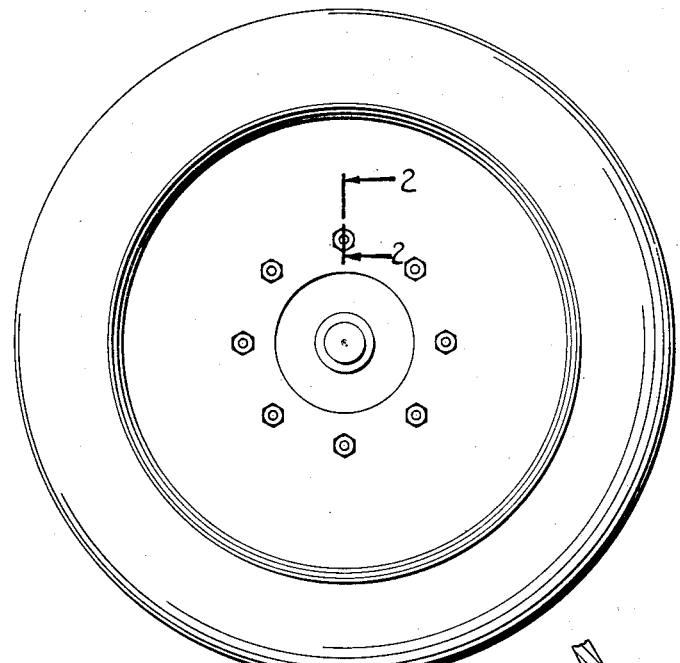
Figure 1 is a view in side elevation of my improved wheel atached to a hub flange.

Referring to the drawing by reference characters, the numeral 10 indicates a radially extending hub flange having an annular axial projection 11 extending therefrom. The hub flange is inwardly depressed at a plurality of points as indicated at 12 to form angular seats for inwardly embossed portions 16 in an inner wheel body 15. A series of securing bolts 13 are attached to the hub flange and support threaded convexly faced nuts 14 adjacent the outer face of the hub flange. These convexly faced nuts 14 are provided with bevelled outer faces, as indicated in the drawing.

The inwardly embossed portions 16 of the wheel body are bevelled as indicated at 17 about the bolt hole to provide a conical portion adapted to seat against the conical outer faces of the convexly faced nuts 14. A series of nuts 18, having conical inner and outer faces 19 and 20 and a threaded shank portion 21, are threaded onto the bolts 13. The embossed portions 16 of the inner wheel body 15 are offset at a greater angle with respect to the axis of the wheel than the recessed seats 12, and accordingly, when this wheel body is arranged against the hub flange, these embossed portions do not abut against the recessed seats in the hub flange. This is illustrated in an exaggerated form in Figure 2 of the drawing. When the nuts 18 are screwed home on the bolts 13, however, the conical faces 19 on these nuts spring the embossed portions of the disk into contacting relationship with respect to the recessed portions of the hub flange. It will be readily apparent that in springing the disk inwardly in this manner it will effect a very considerable locking action upon the nut by reason of the resiliency of the bolt hole margin of the disk.

Figures 2, 3, 4:
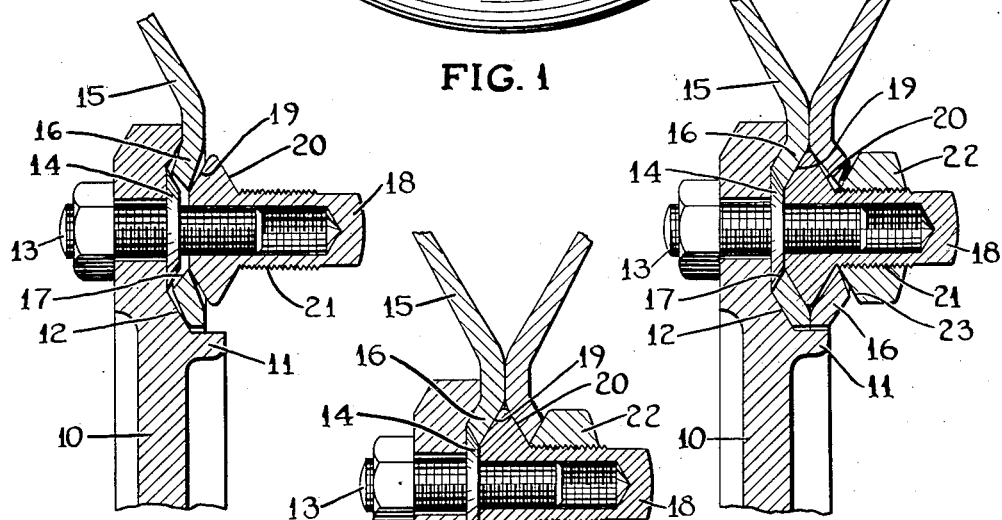
Figure 2 is a section on the line 2—2 of Figure 1 showing the first step in securing the inner wheel in place.
Figure 3 is a section similar to Figure 2 showing the inner wheel completely secured in place and the outer wheel abutting there-against before the securing means for the outer wheel are brought home.
Figure 4 is a view similar to Figure 2 showing my dual wheel completely secured in place.

The outer wheel body is identical in structure with the inner wheel body and is provided with embossed portions 16 which form a lesser angle with respect to the axis of the wheel when the outer wheel body is brought into abutting relationship with the inner wheel body arranged on the hub flange than the angle formed by the outer conical faces of the nuts 18 with respect to the axis. This is best illustrated in Figure 3.

A series of outer securing nuts 22 are provided for coaction with the threaded extensions 21 of the nuts 18 and these nuts 22 are provided with conical inner faces 23 adapted to coact with inner bevelled edges about the openings in the embossed portions 16 of the outer disk to spring these embossed portions down into contacting relationship with respect to the outer conical faces 20 of the nuts 18.

It will thus be seen that I have provided a lock washer action between the inner nuts and the hub flange and between the outer nuts and the conical outer faces on the inner nuts by reason of the resiliency of the metal of the wheel itself.

Modifications will be obvious to those skilled in the art, and I do not, therefore, wish to be limited except by the generic spirit of my invention as interpreted in the light of the prior art and my subjoined claim.

I claim:

A vehicle wheel comprising a hub, a radial flange on said hub, a series of bolts secured to said radial flange, said flange having portions adjacent said bolts depressed to form angularly arranged surfaces constituting seats for portions of an inner wheel body, a series of inwardly embossed portions in said wheel body, a series of nuts adapted to coact with said bolts and with said inwardly embossed portions to distort the latter and resiliently secure said inner wheel body to said hub flange in said angularly arranged surfaces, and urge said inner wheel body towards said hub flange, said nuts having conical inner and outer faces, an outer wheel body provided with a plurality of outwardly embossed portions, said wheel bodies being interchangeable, a second series of nuts arranged for threaded engagement with said first series of nuts and having conical seating portions coacting with said outwardly embossed portions to distort the latter and resiliently secure said outer wheel body between said second series of nuts and the outer conical faces of said first series of nuts and to said hub flange and urge said outer wheel body towards said inner wheel body.

CAROLUS L. EKSERGIAN.